Feb. 2, 1971   B. A. CHRISTOPHER   3,559,327
FISH WARNING DEVICE
Filed Dec. 2, 1968
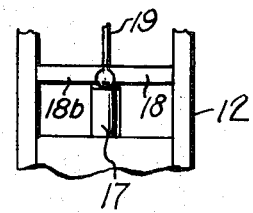
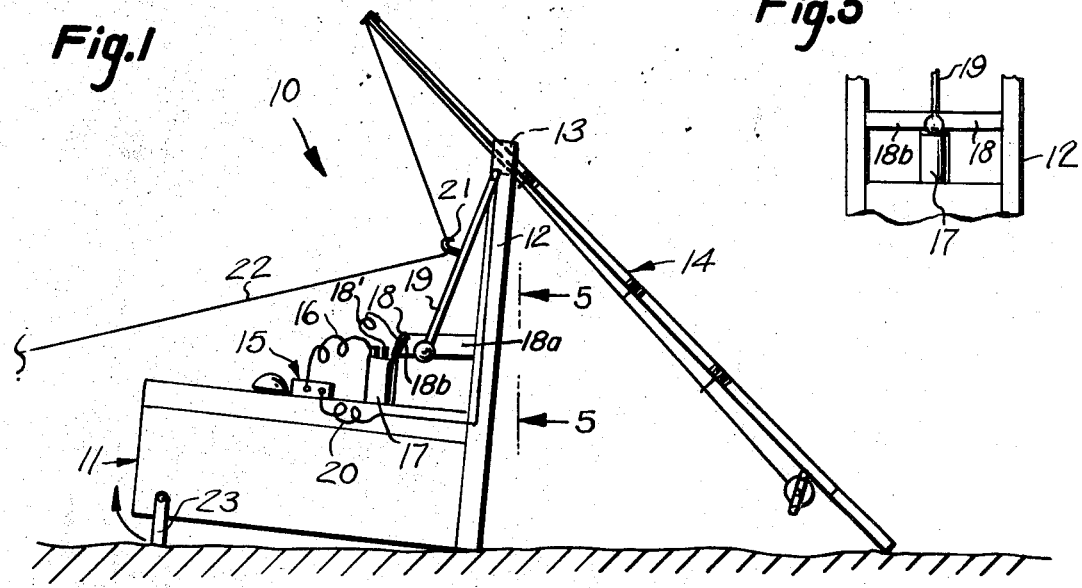
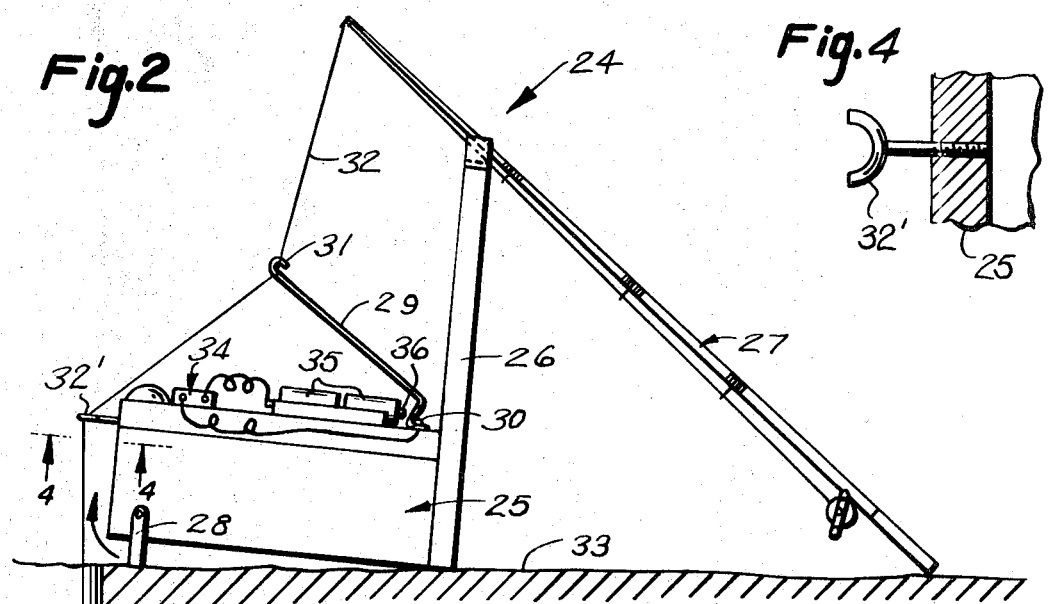
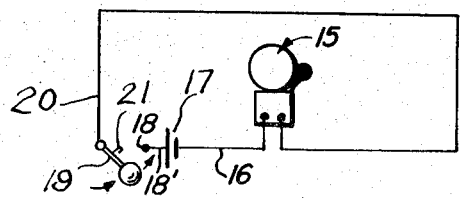
INVENTOR.
BERNARD A. CHRISTOPHER

3,559,327
FISH WARNING DEVICE
Bernard A. Christopher, Wilkes-Barre, Pa., assignor of twenty-five percent each to Chester Baczynski, James Bartoletti and Chris Featherstone, all of Wilkes-Barre, Pa.
Filed Dec. 2, 1968, Ser. No. 780,412
Int. Cl. A01k 97/12
U.S. Cl. 43—17                    2 Claims

ABSTRACT OF THE DISCLOSURE

An apparatus for signaling the movement of a fishing line of a fishing rod by the pull of a fish has a pendulum pivotally attached to and hanging freely from an upwardly extending member. The fishing line passes from the fishing rod, through a hook attached to the pendulum and into a body of water. The pull of a fish on the fishing line causes the pendulum to swing and touch a contact bar to close an electrical circuit and activate a signal, such as a bell.

BACKGROUND OF THE INVENTION

Prior art apparatus provide for the giving of a signal in response to the pull of a fish on a fishing line. However, the switch means of the prior art, for the most part, include a movable member held in the open position by spring means. Thus, the force required to close the switch is constant and not readily adjustable. A fisherman may encounter factors, such as the movement of the water, buoyancy of the fishing line and the type of lure attached to the fishing line, which result in a force on the line sufficient to close the prior art switches and erroneously indicate a pull of a fish. If such factors are encountered, the prior art switches are at best difficult to adjust.

SUMMARY OF THE INVENTION

An object of this invention is to provide an apparatus which can be readily adjusted to compensate for the above factors.

Another object is to provide an apparatus which is economical to manufacture and efficient in operation.

The foregoing objects can be attained by providing an apparatus for signaling the movement of a fishing line of a fishing rod caused by a pull of a fish embodying an upright member to support the fishing rod and comprising a pendulum pivotally attached to the member and hanging freely therefrom, a hook on the pendulum to receive the fishing line, and a contact bar spaced from the member and located in the path of movement of the pendulum. The pendulum and contact bar constitute an electrical switch and form part of an electrical circuit, with the movement of the fishing line by the pull of a fish causing the pendulum to swing, touch the contact bar and activate a signal.

BRIEF DESCRIPTION OF THE DRAWINGS

FIG. 1 is an elevation view of the apparatus.
FIG. 2 is an elevation view of another embodiment of the apparatus.
FIG. 3 is a diagram of the electrical circuit.
FIG. 4 is a view along the line 4—4 of FIG. 2.
FIG. 5 is a view along the line 5—5 of FIG. 1.

DETAILED DESCRIPTION OF THE DRAWINGS

Referring to FIGS. 1 and 5, the apparatus generally referred to as numeral 10 includes a box 11. Attached to one end of box 11 is an upwardly-extending member 12 including spaced portions connected together at their upper ends to form a recess 13 adapted to act as a support for fishing rod 14. Pendulum 19 has its upper end pivotally attached to member 12 and depends freely therefrom. Fishing line 22 extends from the end of fishing rod 14, through hook 21 attached to pendulum 19 and into a body of water (not shown). A horizontally-extending L-shaped contact bar 18 has one leg 18a attached to member 12 and the other leg 18b spaced from member 12 and positioned in the path of movement of the lower end of pendulum 19.

Mounted on the top horizontal surface of box 11 is a battery 17 and a bell 15. As best shown in FIG. 3, battery 17 has one of its poles connected to bell 15 by wire 16 and its other pole connected to contact bar 18 by wire 18'. Bell 15 is connected in series with the upper end of pendulum 19 by wire 20. Pendulum 19 and contact bar 18 constitute a switch for the electrical circuit.

As shown in FIG. 1, one end of box 11 is provided with a leg 23 which is pivotally attached thereto and rests upon the ground. Leg 23 may be adjusted as shown by the arrows to allow the inclination of member 12 to be adjusted with respect to a vertical line. By so doing, the force required to move the pendulum 19 into contact with contact bar 18 can be varied.

Referring to the embodiment shown in FIG. 2, the apparatus is generally referred to as numeral 24 and includes a box 25 and an upright member 26 attached to one end of box 25. Member 26 supports a fishing pole 27 which has a fishing line 32 extending therefrom and passing through hook 31 of leaf spring 29. Line 32 passes over guide 32' attached to frame 25 and into a body of water. FIG. 4 shows guide 32' as an arcuate member.

Mounted on the top horizontal surface of box 25 is a bell 34 and batteries 35. Leaf spring 29, bell 34 and batteries 35 are electrically connected in series, with one pole 36 of a battery 35 and leaf spring 29 acting as a switch for the electrical circuit.

In operating and referring to the preferred embodiment shown in FIGS. 1, 3 and 5, the bite of a fish causes a pull on line 22. This pull causes pendulum 19 to swing about its upper end, touch contact bar 18, close the electrical circuit and activate bell 15. Thus, a signal is given that a fish has caused line 22 to move.

If the factors heerianbove set forth are such as to cause pendulum 19 to move and touch contact bar 18 without the pull of a fish being exerted, leg 23 can be adjusted to further incline member 12, i.e, move the upper end of member 12 to the right as viewed in FIG. 1. This further inclination of member 12 requires pendulum 19 to swing through a greater vertical distance to touch contact bar 18. Thus, a greater force will be required to close the electrical circuit and activate bell 15.

The operation of the embodiment shown in FIG. 2 is similar to the above described operation except leaf spring 29 moves in response to the pull of a fish on line 32 and contacts pole 36 of battery 35 to close the electrical circuit and activate the bell 34.

While a bell is shown in the drawings and described above, it should be understood that other electrical signal means could be substituted for the bell.

What is claimed is:

1. In an apparatus for signaling the movement of a fishing line of a fishing rod caused by the pull of a fish embodying an upwardly-extending member for supporting a fishing rod, the improvement comprising
   (a) a pendulum pivotally attached at its upper end to said member and hanging freely therefrom,
   (b) a hook fixedly attached to said pendulum intermediate the ends thereof and adapted to receive said fishing line,
   (c) a horizontally-extending contact bar fixedly positioned with respect to said member and located in the path of movement of the lower end of said pendulum,
   (d) said pendulum and said contact bar constituting an electrical switch and forming part of an electrical circuit, with the movement of said fishing line by said pull causing said pendulum to swing and touch said contact bar to close said electrical circuit, and
   (e) signal means in said electrical circuit responsive to the closing of said circuit to signal the movement of said fishing line.

2. The apparatus described in claim 1 including means to adjust the inclination of said member with respect to a vertical line.

References Cited
UNITED STATES PATENTS

| | | | |
|---|---|---|---|
| 522,352 | 7/1894 | Poppowitsch | 43—17 |
| 2,554,197 | 5/1951 | Kronquest | 43—17 |
| 2,596,403 | 5/1952 | Hoffman | 43—21.2 |
| 2,869,275 | 1/1959 | Levin | 43—17 |
| 3,389,489 | 6/1968 | Burns | 43—17 |

SAMUEL KOREN, Primary Examiner

D. J. LEACH, Assistant Examiner

U.S. Cl. X.R.

43—21.2